UNITED STATES PATENT OFFICE 2,500,762

LUBRICANT COMPOSITION

Eugene Lieber, Chicago, Ill., assignor to Standard Oil Development Company, a corporation of Delaware No Drawing. Application January 2, 1947, Serial No. 719,943

13 Claims. (Cl. 252—49.9)

This invention relates to a novel type of chemical condensation product and to methods of preparing such products and using them for various purposes, more particularly as pour depressors in waxy lubricating oils. This application is a continuation in part of Ser. No. 470,641, filed December 30, 1942, now abandoned.

Broadly, the invention comprises chemically condensing aromatic compounds with a phosphorus halide in the presence of a larger amount of catalyst than used heretofore, and thereby making high molecular weight phosphorus-interlinked products having wax-modifying properties.

The aromatic compounds to be used may be alkylated derivatives of the simple aromatic hydrocarbons, such as benzene, naphthalene, anthracene, etc., such as toluene, xylene, isopropyl benzene, methyl naphthalene, tertiary butyl benzene, amyl benzene, di-amyl benzene, amyl naphthalene, di-amyl naphthalene, polyamyl naphthalene, etc., such as phenol, amyl phenol, amyl naphthol, N-amyl aniline, anthrol, etc. When making condensation products intended for use as addition agents in mineral lubricating oils, such as for use as pour depressors in waxy mineral lubricating oils, it is preferred to use aromatic compounds containing more than 2 and preferably more than 3 aliphatic carbon atoms per molecule.

The phosphorus halide to be used may be either a simple halide having the general formula $PX_n$, in which X is a halogen atom and $n$ represents an integer of 3 or 5 corresponding to a valency of phosphorus, or an oxy halide in which two or more of the valencies of phosphorus are satisfied by oxygen instead of by halogen. Specific examples of suitable phosphorus halides include the following: $PCl_3$, $PCl_5$, $POCl_3$, $PBrCl_4$, $POBr_2Cl$, etc.

The condensation is carried out in the presence of a condensation catalyst, preferably of the Friedel-Crafts type, such as anhydrous aluminum chloride, boron fluoride, zinc chloride, ferric chloride, titanium tetrachloride, hydrogen fluoride, etc.; the proportion thereof should normally be within the approximate range of 0.2–2.0, mols per mol of the phosphorus halide. This is a critically important feature of the invention because smaller proportions, e. g. 0.02 mol of $AlCl_3$ does not effect the interlinking action which produces the high mol wt. products having wax-modifying properties.

The proportions of reactants may vary quite widely, without departing from the spirit of the invention, but usually about ½ to 10 mols of the alkylated aromatic compound should be used, preferably about 1 to 8 mols of alkylated aromatic compound should be used per mol of the phosphorus halide.

Although not necessary, it is preferable to use an inert solvent in carrying out the reaction, and if one is used, it is desirable to use ½ to 10 volumes, preferably 1 to 5 volumes, of solvent per volume of total reactant. As suitable solvents may be mentioned a refined (substantially inert) kerosene or heavy naphtha, carbon bisulfide, nitrobenzene, polychlor benzene (such as ortho-dichlor benzol) tetrachlorethane, and others.

The reaction temperature should generally be between the approximate limits of room temperature and 300° F., preferably about 150–200° F., or 250° F. It is best to start the reaction at room temperature and finish by heating for about 1 to 10 hours at a final reaction temperature of 150–300° F. The reaction is ordinarily carried out at atmospheric pressure, although if desired either super-atmospheric or sub-atmospheric pressure may be used.

In carrying out the invention various procedures may be used in mixing the reactants and catalyst. One order of mixing is to disperse the catalyst in the aromatic compound together with an inert solvent, if one is used, and then to add the phosphorus halide last. An alternative procedure is to dissolve the aromatic compound in the inert solvent, add the phosphorus halide and finally add the aluminum chloride or other catalyst.

If desired, the reactants and catalyst may be all mixed together at room temperature, and then the whole reaction mixture may be heated to the desired reaction temperature and maintained thereat for the desired length of time. After the reaction has been substantially completed, the mixture is preferably cooled, diluted with an inert diluent or solvent, such as a refined kerosene, and the aluminum chloride or other catalyst used destroyed by addition of water, dilute acid or alkali, or an aqueous alcohol mixture thereto. After settling, the catalyst sludge is drawn off and discarded and the kerosene extract so obtained is washed free of acid and then distilled under reduced pressure, such as by fire and steam, or under vacuum, e. g. 1 to 50, preferably about 5 to 20 min. mercury absolute pressure, to remove solvent and low boiling products. The distillation temperature should be carried up to about 500° F. or 600° F.

The distillation residue constitutes the desired reaction product.

This condensation product generally has a molecular weight much higher than that of the original alkylated aromatic compound used as raw material, and although the exact chemical structure of this condensation product is not known with certainty, it is believed likely that the phosphorus atom of the phosphorus halide acts as an interlinking agent in joining several molecules of the alkylated aromatic compound. When the aromatic compound used as raw material contains more than 2 aliphatic carbon atoms, and preferably more than 3, the resulting condensation product is generally soluble in mineral oils and has wax-modifying properties, as indicated by the fact that it depresses the pour point of waxy mineral lubricating oils when added thereto in small amounts, such as in concentrations between about 0.1% and 10%, or preferably between about 0.2% and 5%. Such wax modifiers may also be used, if desired, as dewaxing aids in the reduction of the wax content of waxy mineral lubricating oils.

For the sake of illustration but without limiting the invention to the particular materials used, the following experimental data are given.

A series of five tests were made in which phosphorus trichloride ($PCl_3$) was reacted with monoamyl naphthalene in the presence of aluminum chloride as catalyst, using several different proportions of the reactants and catalyst, and also in certain cases using a refined kerosene as solvent. The proportions of materials and reaction conditions are shown in the following table, together with data showing the A. S. T. M. pour point of 2% and 5% blends of the condensation product in a waxy mineral lubricating oil (derived from a Pennsylvania crude) having a pour point of +30° F.

tially as described in Patent 2,276,492 and consisted in mixing 6 grams of anhydrous aluminum chloride with 276 grams of monoamyl benzene at room temperature, and then gradually adding 275 grams of phosphorus trichloride to the mixture at room temperature over a period of about one hour. The reaction temperature was then raised to 200–210° F. and held for 20 hours at that temperature. The reaction mixture was submitted to a vacuum distillation at 60 mm. mercury absolute pressure and an overhead distillate taken between 260–420° F. was obtained comprising 13 grams of light yellow liquid. The bottoms product of the distillation comprised 12 grams of a brown viscous oil. The overhead distillate showed 0.94% chlorine by analysis, and the bottoms fraction showed 0.64% chlorine. Both fractions were tested for pour depressing properties by blending them in 5% concentration in a waxy lubricating oil basestock having an original pour point of +25° F. (by A. S. T. M. procedure). Both resulting blends had the same pour point of +25° F. and therefore neither the overhead distillate nor the bottoms fraction had any pour depressing properties.

It is believed that the primary reason why the large amount of catalyst used in the present invention makes products having pour depressing properties whereas the small amount of catalyst used heretofore does not, is that the small amount of catalyst leads to the formation essentially of amyl benzene dichlor phosphine, with a small amount of diamyl benzene monochlor phosphine, and possibly a trace of triamyl benzene phosphine, whereas it is believed that the larger amount of catalyst rapidly removes substantially all of the chlorine from the phosphorus trichloride and causes interlinking of a plurality of phosphorus atoms with a plurality of

TABLE

*Pour depressants by condensation of phosphorus chloride with aromatics*

| Test No. | Reagents [1] | | | | | Reaction | | Yield, Gms. | ° F. Pour Test [2] | | Product Description |
|---|---|---|---|---|---|---|---|---|---|---|---|
| | Gms. $PCl_3$ | Aromatic Compound | Gms. Used | Solvent | Vol. Used | Gms. $AlCl_3$ | Temp., ° F. | Time, Hrs. | | 2.0% | 5.0% | |
| 1 | 69 | Mono-amyl naphthalene | 99 | Kerosene | 500 | 13 | 175 | 4 | 104 | +15 | −10 | Brown oil. |
| 2 | 69 | ...do... | 99 | ...do... | 500 | 40 | 175 | 4 | 92 | +15 | −5 | Green oil. |
| 3 | 138 | ...do... | 198 | None | | 80 | Room | 96 | 194 | +25 | −5 | Dark green visc. oil. |
| 4 | 10 | ...do... | 99 | Kerosene | 500 | 13 | 175 | 4 | 102 | +20 | −5 | Do. |
| 5 | 10 | ...do... | 95 | ...do... | 500 | 40 | 175 | 4 | 101 | +15 | −5 | Dark green oil. |

[1] In all of the runs $PCl_3$ was added last.
[2] The pour point of the original oil is +30° F.

It is thus seen from the above table that the condensation products which in all cases were oils ranging from a green to brown color, several being quite viscous in consistency, reduced the pour point of the waxy mineral lubricating oil from +30° F. down to about +15° F. when used in 2% concentration and down to about −5° F., or lower when used in 5% concentration. These results are very surprising indeed, because reactions of the type in question would not be expected to give condensation products having any pour-depressing properties whatsoever.

To emphasize how unexpected the results of the present invention are, the following laboratory tests are given as representing the prior art process as carried out with a much smaller amount of catalyst than used according to the present invention. This test is made substanamyl benzene or other alkylated aromatic compound to make a resulting high molecular weight polymeric compound. The yields obtained by the present invention, as set forth in the table above, indicate that little if any products are obtained which would distill overhead between 130° C. and 210° C. at 20 mm. absolute pressure as used in the prior art for collecting the main portion of the reaction product which consists largely of amyl benzene dichlor phosphine.

It is not intended that this invention be limited to any of the specific examples which were given merely for the sake of illustration nor to any theory as to the mechanism of this invention, but only by the appended claims in which it is intended to claim all novelty inherent in the invention as well as all modifications coming within the scope and spirit of the invention.

I claim:
1. The process which comprises condensing 0.5 to 10 mols of an alkylated aromatic compound with 1 mol of a phosphorus halide in the presence of a Friedel-Crafts catalyst in a concentration of about 0.2 to 2.0 mols per mol of phosphorus halide.

2. The process which comprises condensing 1 to 8 mols of an alkylated aromatic compound with 1 mol of a phosphorus halide in the presence of about 0.2 to 2.0 mols of a Friedel-Crafts catalyst per mol of phosphorus halide hydrolyzing and removing the catalyst, and distilling the reaction product under reduced pressure to obtain the desired product as distillation residue.

3. The process which comprises condensing 0.5 to 10 mols of an alkylated aromatic compound having more than 2 aliphatic carbon atoms with 1 mol of a phosphorus halide having the general formula $PX_n$, in which X is a halogen atom and $n$ is an integer of 3 or 5, in the presence of about 0.2 to 2.0 mols of Friedel-Crafts catalyst per mol of the phosphorus halide.

4. The process which comprises condensing ½ to 10 mols of amyl naphthalene with 1 mol of phosphorus trichloride in the presence of about 0.2 to 2.0 mols of aluminum chloride as catalyst per mol of phosphorus trichloride, hydrolyzing and removing the catalyst and distilling the reaction product under reduced pressure to a temperature of at least about 500° F. to obtain the desired product as distillation residue.

5. Process according to claim 4 carried out in the presence of an inert solvent and at a temperature between the approximate limits of room temperature and about 300° F.

6. Product consisting essentially of a high molecular weight polymeric condensation product of 0.5 to 10 mols of an alkylated aromatic compound with 1 mol of a phosphorus halide, said product being substantially non-volatile at all temperatures up to about 500° F. under reduced pressure wherein the condensation catalyst consists essentially of 0.2 to 2.0 mols of a Friedel-Crafts catalyst per mol of phosphorus halide.

7. Product consisting essentially of a polymeric Friedel-Crafts condensation product of 0.5 to 10 mols of an aromatic compound having more than 2 aliphatic carbon atoms and 1 mol of a phosphorus halide having the general formula $PX_n$, in which X is a halogen atom and $n$ is an integer of 3 or 5, said condensation product being substantially non-volatile at all temperatures up to about 500° F. under reduced pressure wherein the condensation catalyst consists essentially of 0.2 to 2.0 mols of a Friedel-Crafts catalyst per mol of phosphorus halide, and having wax-modifying properties.

8. Product consisting essentially of a polymeric Friedel-Crafts condensation product of 0.5 to 10 mols of amyl naphthalene with 1 mol of phosphorus trichloride, said condensation product being substantially non-volatile at all temperatures up to about 500° F. under reduced pressure wherein the condensation catalyst consists essentially of 0.2 to 2.0 mols of a Friedel-Crafts catalyst per mol of phosphorus halide, and having wax-modifying properties.

9. A viscous oily product soluble in mineral oil and having the property of depressing waxy mineral lubricating oils when added thereto in small amounts, said product consisting essentially of a polymeric Friedel-Crafts condensation product of 0.5 to 10 mols of amyl naphthalene with 1 mol of phosphorus trichloride, said condensation product being substantially non-volatile at all temperatures up to about 500° F. under reduced pressure wherein the condensation catalyst consists essentially of 0.2 to 2.0 mols of a Friedel-Crafts catalyst per mol of phosphorus halide.

10. Product according to claim 9 derived by condensation of amyl naphthalene with phosphorus trichloride in the presence of 0.2 to 2.0 mols of aluminum chloride per mol of $PCl_3$, and in the presence of an inert solvent, at a reaction temperature between about room temperature and about 300° F., followed by hydrolyzing and removing the catalyst and distilling the reaction product under reduced pressure to at least about 500° F. to obtain the desired product as distillation residue.

11. A lubricant consisting essentially of a major proportion of a waxy mineral lubricating oil, and dissolved therein a small but pour depressing amount of a polymeric condensation product of 0.5 to 10 mols of an aromatic compound containing more than 2 aliphatic carbon atoms and 1 mol of a phosphorus halide having the general formula $PX_n$, in which X is a halogen atom and $n$ is an integer of 3 or 5, said condensation product being substantially non-volatile at all temperatures up to about 500° F. under a pressure of 1 to 20 millimeters of mercury and having wax-modifying properties wherein the condensation catalyst consists essentially of 0.2 to 2.0 mols of a Friedel-Crafts catalyst per mol of phosphorus halide.

12. A lubricant consisting essentially of a major proportion of a waxy mineral lubricating oil, containing dissolved therein a small but pour-depressing amount of a condensation product of 0.5 to 10 mols of amyl naphthalene and 1 mol of phosphorus trichloride, said condensation product being substantially non-volatile at all temperatures up to about 500° F. under a pressure of 1 to 50 millimeters absolute and having been made by the process of claim 4.

13. Composition consisting essentially of a major proportion of a waxy mineral oil and a small but pour depressing amount of an oil soluble polymeric condensation product of 0.5 to 10 mols of an aromatic compound with 1 mol of a phosphorus halide, wherein the condensation catalyst consists of 0.2 to 2 mols of a Friedel-Crafts catalyst per mol of phosphorus halide, said product being substantially non-volatile at all temperatures up to about 500° F. under pressure of 1 to 50 millimeters absolute and having wax modifying properties.

EUGENE LIEBER.

REFERENCES CITED

The following references are of record in the file of this patent:

UNITED STATES PATENTS

| Number | Name | Date |
|---|---|---|
| 1,921,364 | Lommel | Aug. 8, 1933 |
| 2,138,835 | Butz | Dec. 6, 1938 |
| 2,146,584 | Lipkin | Feb. 7, 1939 |
| 2,190,715 | Jolly et al. | Feb. 20, 1940 |
| 2,276,492 | Jolly et al. | Mar. 17, 1942 |